(12) United States Patent
Al-Dhahir et al.

(10) Patent No.: US 8,588,286 B2
(45) Date of Patent: Nov. 19, 2013

(54) PROCESSOR, MODEM AND METHOD FOR CANCELLING ALIEN NOISE IN COORDINATED DIGITAL SUBSCRIBER LINES

(75) Inventors: Naofal M. Al-Dhahir, Plano, TX (US); Oren E. Eliezer, Plano, TX (US); Jaiminkumar A. Mehta, Richardson, TX (US); Dennis I. Robbins, Richardson, TX (US); Aaron M. Lancour, Amarillo, TX (US); Aditya Awasthi, Richardson, TX (US)

(73) Assignee: XW, LLC, Dallas, TX (US)

( * ) Notice: Subject to any disclaimer, the term of this patent is extended or adjusted under 35 U.S.C. 154(b) by 147 days.

(21) Appl. No.: 13/086,517

(22) Filed: Apr. 14, 2011

(65) Prior Publication Data

US 2012/0093204 A1  Apr. 19, 2012

Related U.S. Application Data

(60) Provisional application No. 61/348,042, filed on May 25, 2010.

(51) Int. Cl.
*H04B 1/38* (2006.01)

(52) U.S. Cl.
USPC ............................ 375/222; 375/220; 375/296

(58) Field of Classification Search
USPC .......................... 375/220, 222, 296
See application file for complete search history.

(56) References Cited

U.S. PATENT DOCUMENTS

| 7,499,487 | B2 | 3/2009 | Ginis et al. | |
| 8,223,872 | B1* | 7/2012 | Zhang et al. | 375/267 |
| 2006/0114977 | A1* | 6/2006 | Ginis et al. | 375/222 |
| 2009/0175156 | A1* | 7/2009 | Xu | 370/201 |

OTHER PUBLICATIONS

Biyani, et al.; "Cooperative MIMO for Alien Noise Cancellation in Upstream VSDL". In Proceedings of ICASSP Conference, 2009; pp. 2645-2648.
Cendrillon, et al.; A Near-Optimal Linear Crosstalk Canceler for Upstream VDSL; IEEE Transactions on Signal Processing, Aug. 2006; pp. 3136-3146.
T. Starr, et al.; "Understanding Digital Subscriber Line Technology"; Prentice Hall 1999; 8 pages.
G. Golub, et al; "Matrix Computations"; John Hopkins University Press, Second Edition, 1989; 7 pages.

* cited by examiner

*Primary Examiner* — Kabir A Timory

(57) ABSTRACT

A method of cancelling alien noise in coordinated DSL lines, a method of smoothing an alien noise covariance estimate, and a processor and modem for cancelling alien noise in coordinated DSL lines. In one embodiment, the method of cancelling alien noise includes: (1) estimating alien noise vectors for at least some training symbols, (2) arranging the alien noise vectors in a matrix dimensioned for a number of coordinated DSL lines, (3) orthonormally transforming the matrix into a lower-triangular matrix and (4) computing alien noise prediction filters from the lower-triangular matrix.

26 Claims, 6 Drawing Sheets

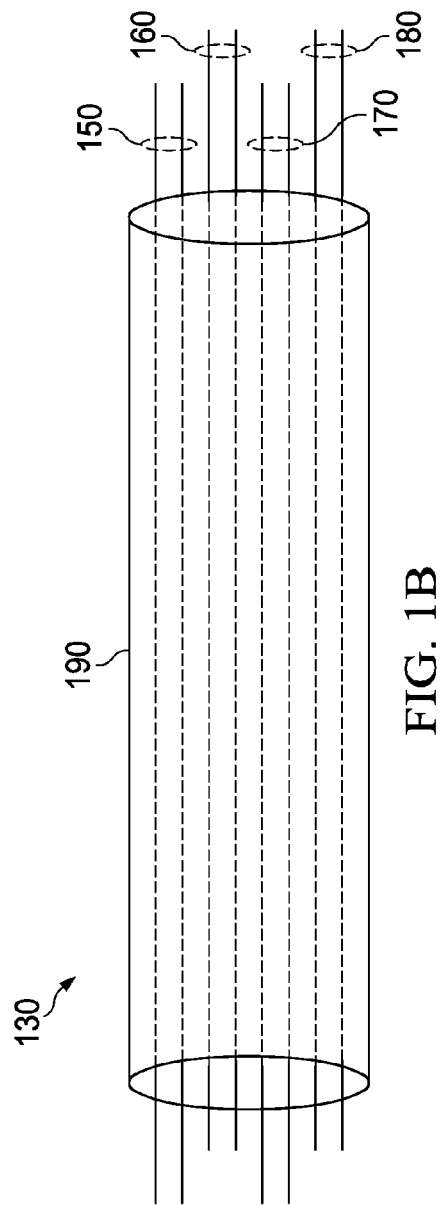
FIG. 1A
FIG. 1B

PROCESSOR, MODEM AND METHOD FOR CANCELLING ALIEN NOISE IN COORDINATED DIGITAL SUBSCRIBER LINES

CROSS-REFERENCE TO RELATED APPLICATION

This application claims the benefit of U.S. Provisional Application Ser. No. 61/348,042, filed by Al-Dhahir, et al., on May 25, 2010, entitled "Alien Noise Cancellation Method for Coordinated DSL Lines," commonly assigned with this application and incorporated herein by reference.

U.S. GOVERNMENT LICENSE RIGHTS

This invention was made with U.S. Government support under National Science Foundation SBIR Grant No. 1047336. The U.S. Government has certain rights in the invention.

TECHNICAL FIELD

This application is directed, in general, to a digital communications system and, more specifically, to interference reduction in the context of Digital Subscriber Line (DSL) lines.

BACKGROUND

Alien noise, also known as out-of-domain interference, in a DSL cable binder is due to crosstalk (both far-end, or FEXT, and near-end, or NEXT) from non-coordinated lines within the same binder or from adjacent binders. The coordinated lines within a multi-twisted-pair system benefit from knowledge of the signals causing the in-domain interference, and this is exploited in the cancellation of such crosstalk using prior-art techniques, such as vectored-transmission. Non-idealities in the in-domain crosstalk cancellation result in residual self FEXT between the coordinated lines, which is an additional component to the alien noise, potentially limiting the performance in the system. If left uncompensated, alien noise can diminish any performance gains realized by self FEXT cancellation. In general, alien noise cancellation techniques exploit the spatial correlation of alien noise across coordinated lines to generate prediction filter coefficients that synthesize and cancel the spatially-correlated alien noise. However, conventional alien noise cancellation techniques (see, e.g., Biyani, et al., "Cooperative MIMO for Alien Noise Cancellation in Upstream VDSL," In Proc. of ICASSP Conf., 2009) use a least-mean-square (LMS) technique to compute approximate alien noise prediction filter coefficients. The LMS technique is iterative, suboptimal and often slow to converge, whereas the systems requiring the noise cancellation, such as cellular backhaul systems, typically do not permit extended latencies and cannot afford iterative or slow-converging solutions for noise cancellation.

SUMMARY

One aspect of the invention provides a method of cancelling alien noise. In one embodiment, the method includes: (1) estimating alien noise vectors for at least some training symbols, (2) arranging the alien noise vectors in a matrix dimensioned for a number of coordinated DSL lines, (3) orthonormally transforming the matrix into a lower-triangular matrix and (4) computing alien noise prediction filters from the lower-triangular matrix.

Another aspect provides a method of smoothing an alien noise covariance estimate. In one embodiment, the method includes: (1) forming an alien noise power spectral density estimate vector for each pair of coordinated DSL lines, (2) taking an inverse discrete Fourier transform (DFT) of each the alien noise power spectral density estimate vector to generate alien noise time correlation estimate vectors, (3) smoothing the alien noise time correlation estimate vectors and (4) generating smoothed alien noise covariance estimate vectors from the alien noise time correlation estimate vectors.

Yet another aspect provides a method of cancelling alien noise in coordinated DSL lines. In one embodiment, the method includes: (1) choosing a reference DSL line from the coordinated DSL lines, (2) dividing remaining coordinated DSL lines into subsets, each subset including the reference DSL line and (3) applying a de-correlation technique to each subset of DSL lines.

Still another aspect provides a processor for cancelling alien noise. In one embodiment, the processor includes: (1) circuitry configured to estimate alien noise vectors for at least some training symbols, (2) circuitry configured to arrange the alien noise vectors in a matrix dimensioned for a number of coordinated DSL lines, (3) circuitry configured to orthonormally transform the matrix into a lower-triangular matrix and (4) circuitry configured to compute alien noise prediction filters from the lower-triangular matrix.

Yet still another aspect provides a DSL modem. In one embodiment, the modem includes: (1) a transmitter portion having a digital input and an analog output and (2) a receiver portion having an analog input and a digital output and including a processor coupled to the DFT block and configured to perform self-FEXT and alien interference cancellation on a DMT signal based on self-FEXT coefficients estimated in a channel estimation block and a vectoring channel estimation block and alien noise coefficients estimated from an alien noise estimation block to yield a higher signal-to-interference ratio for the DMT signal.

Still yet another aspect provides a method of updating a triangular factor matrix. In one embodiment, the method includes: (1) appending new alien noise sample vectors derived from signals received from a number of coordinated DSL lines to a current triangular factor matrix, (2) applying orthonormal transformations to zero out the new appended alien noise vectors thereby to update the current triangular factor matrix to a new triangular factor matrix and (3) computing alien noise prediction filters from the triangular factor matrix.

BRIEF DESCRIPTION

Reference is now made to the following descriptions taken in conjunction with the accompanying drawings, in which:

FIG. 1A is a high-level schematic diagram of one embodiment of a cellular telephone base station and a copper backhaul link that couples the cellular telephone base station to a carrier network;

FIG. 1B is a high-level schematic diagram of one embodiment of the copper backhaul link of FIG. 1A;

Figure 8:
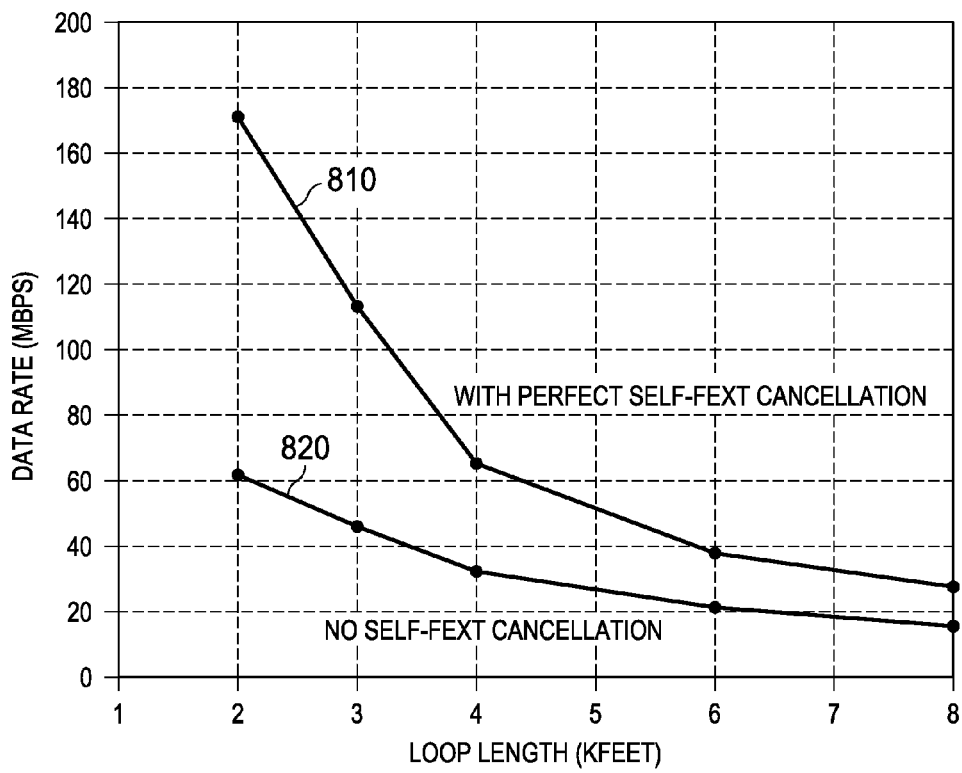
Figure 9:
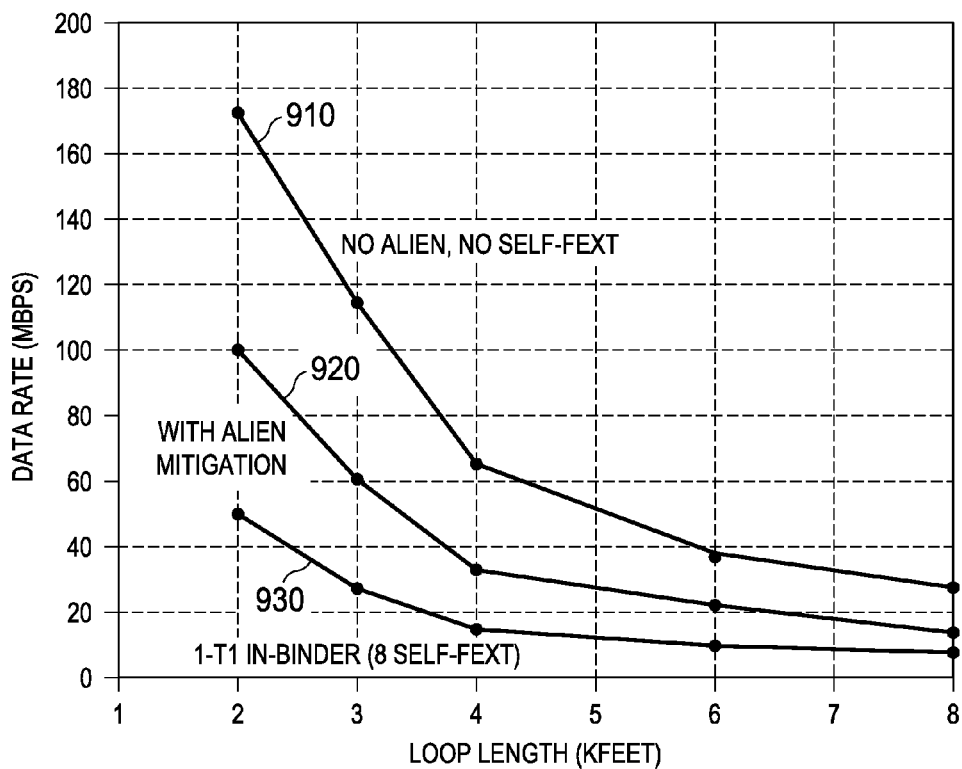

FIG. 8 is a graph comparing data rates as a function of copper backhaul link length for an embodiment of the invention under conditions of perfect self-FEXT cancellation and no self-FEXT cancellation; and FIG. 9 is a graph showing data rates as a function of copper backhaul link length for an embodiment of the invention employing neither self-FEXT cancellation nor alien mitigation, an embodiment of the invention employing only alien mitigation and an embodiment of the invention with eight coordinated lines and only self-FEXT cancellation and coexisting with a T1 line in the same copper binder.

DETAILED DESCRIPTION

Described herein are various embodiments of a reduced-complexity method of achieving at least near-optimum alien noise cancellation in a DSL binder and a processor and modem configured to achieve at least near-optimum alien noise cancellation in a DSL binder by way of a reduced-complexity method. The embodiments generally target the cancellation of alien noise that may be implemented in a system that has latency and cost constraints, such that implementation complexity is an important factor. In general, the method reduces noise due to radio-frequency interference (RFI), FEXT and NEXT originating from non-coordinated lines, residual self-FEXT among coordinated lines and residual correlated noise by exploiting the spatial correlation of alien noise across the coordinated lines. Predictive filter coefficients may then be computed to synthesize and cancel the alien noise.

In various embodiments, the computational complexity of calculating alien noise prediction filter coefficients is reduced by determining a lower-triangular (Cholesky) factor for an estimated alien noise spatial auto-covariance matrix. In some embodiments, this determination is made in a non-iterative (colloquially known as a "one-shot") manner. In certain embodiments, the filter coefficients are at least near-optimum. In a specific embodiment, the filter coefficients are optimum. Because these embodiments of the method compute the filter coefficients non-iteratively, latency that conventional, iterative approaches incur is avoided.

One environment, within which certain embodiments of the method may be incorporated, will now be described. FIG. 1A is a high-level schematic diagram of that environment. A cellular telephone base station 110 is coupled via first and second modulator/demodulators (modems) 120 and a copper channel for backhaul 130 (sometimes referred to herein as a "loop") to a carrier network 140. Data, often representing a mix of voice, video, computer data and control signals, passes between the cellular telephone base station 110 and the carrier network 140 and over the first and second modems 120 and the channel 130. The modems 120 act both as transmitters and receivers simultaneously by dividing the available spectrum between the upstream direction (from the cellular telephone base station 110 to the carrier network 140) and the downstream direction (from the carrier network 140 to the cellular telephone base station 110).

FIG. 1B is a high-level schematic diagram of one embodiment of the channel 130 of FIG. 1A. This embodiment of the channel 130 includes multiple pairs of copper wire. Four pairs of copper wire 150, 160, 170, 180 are shown and referenced in FIG. 1B, although more pairs are contained in a typical copper backhaul link. In the illustrated embodiment, the pairs of copper wire 150, 160, 170, 180 are each twisted pairs. Each pair of copper wires 150, 160, 170, 180 is configured to act as a separate channel. A shield 190 (sometimes referred to as a "copper binder") surrounds and is designed to protect the pairs of copper wire 150, 160, 170, 180 from electromagnetic interference (EMI) originating from outside the channel 130, and also serves to reduce the amount of interference that the signals within the binder can create for potential victims outside of the binder. However, the shield 190 is not designed to protect the pairs of copper wire 150, 160, 170, 180 from interfering with each other and, in fact, may exacerbate the interference. Therefore, as described above, crosstalk (both FEXT and NEXT) can arise between and among adjacent pairs of copper wire, including the pairs of copper wire 150, 160, 170, 180. The crosstalk has been found to be particularly harmful, potentially, when one or more of the pairs of copper wire 150, 160, 170, 180 is being used to carry digital data (known in the United States as a T-carrier, or a digital service, or DS, carrier and known in Europe as an E-carrier). Those skilled in the pertinent art are familiar with T-carriers, e.g., T1, T3, etc., and E-carriers.

Various embodiments of the method, processor and modem described herein are configured to employ multiple of the pairs of copper wire 150, 160, 170, 180 in concert to carry data from one end to another of the channel 130. For example, certain embodiments are configured to employ eight pairs of copper wire in concert. When multiple of the pairs of copper wire 150, 160, 170, 180 are thus employed, the channel 130 may be regarded as a DSL binder (the shield 190 providing a physical binder for the channel 130). As will be described more particularly below, some of these embodiments are capable of achieving data rates significantly exceeding those achievable by means of other methods, including T-carrier or E-carrier digital methods.

It should be noted that various embodiments described herein are configured to reduce alien noise originating from either or both of single-carrier based transmitters, such as T1 or Single-line High-speed DSL (SHDSL) transmitters, and multi-carrier based transmitters, such as Asymmetric DSL (ADSL), ADSL2+, VDSL and VDSL2 transmitters. The noise source may be in the same copper binder, in an adjacent copper binder or in no copper binder whatsoever ("non-binder external sources").

Having described one environment within which certain embodiments of the method may be incorporated, a modem configured to contain a processor capable of achieving at least near-optimum alien noise cancellation in a DSL binder by way of a reduced-complexity method will now be described.

Figure 2:
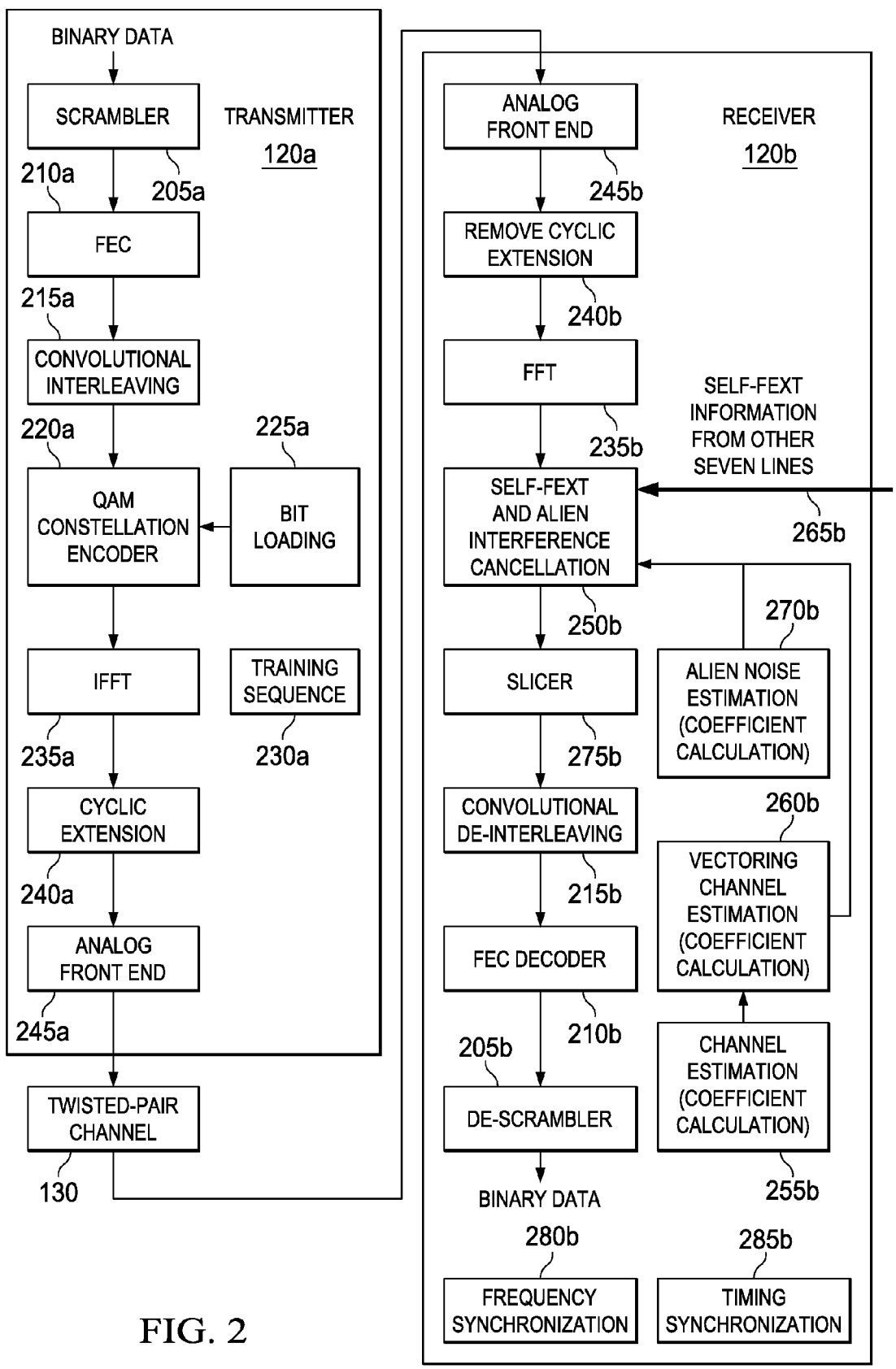
FIG. 2 is a block diagram of one embodiment of a modem in which various embodiments of a processor for, and method of, cancelling alien noise in coordinated DSL lines may be incorporated or carried out.

FIG. 2 is a block diagram of one embodiment of a modem in which various embodiments of a processor for, and method of, cancelling alien noise in coordinated DSL lines may be incorporated or carried out.

Digital (i.e., binary) data (e.g., from the cellular telephone base station 110 or the carrier network 140 of FIG. 1A) is provided to a digital data input of a transmitter portion 120a of a modem (e.g., one of the first and second modems 120 of FIG. 1A). A scrambler block 205a is configured to randomize the data. A forward error correction (FEC) block 210a is configured to increase the redundancy of the data and allow for corrections of errors in the receiver that occur in noisy channels, as is well known in the prior art. A convolutional interleaving block 215a is configured to interleave the data to decrease the likelihood that a temporary corruption, such as a short impulse, will completely destroy a portion of the data, as is commonly employed in prior art communication systems. A quadrature amplitude modulation (QAM) constellation encoder block 220a is configured to transform the convolutionally interleaved data into time-domain QAM symbols based on a mapping of bits to symbols provided by a bit loading block 225a.

Training sequences provided by a training sequence block 230a are employed to allow for channel estimation, which is used to tailor the bit loading and QAM symbols for transmission conditions, as is done in prior art systems. In the illustrated embodiment, the transmitter portion 120a is a discrete multi-tone (DMT) transmitter, and the training sequences are predetermined sequences of training DMT symbols. In a more specific embodiment, the transmitter portion 120a is a discrete wavelet transmitter, wherein the sinusoidal carriers (or "tones") are replaced with an orthogonal basis-set based on wavelets.

The symbols generated by the QAM constellation encoder block 220a are provided to an inverse discrete Fourier transform, or DFT (e.g., fast Fourier transform, or IFFT), block 235a configured to create the discrete-multi-tone (DMT) transmission of multiple subcarriers, each of which will have an instantaneous complex magnitude that corresponds to the QAM signal it is carrying at that instance. A cyclic extension block 240a is configured to add cyclic prefixes to the transformed QAM symbols, as is done in prior art systems of this type. Finally, an analog front-end (AFE) 245a is configured to convert the digitally represented multiple-subcarrier DMT signal into an analog waveform that is fed into the wireline channel at the output of transmitter 120a.

The channel 130 is coupled to an analog input of a receiver portion 120b of a modem (e.g., one of the first and second modems 120 of FIG. 1A). An analog front-end 245b is configured to amplify and digitize the incoming signals from the channel 130. A cyclic extension removal block 240b is configured to remove the cyclic prefixes, having served their purpose. A discrete Fourier transform (e.g., FFT) block 235b is configured to demodulate the input DMT signal, essentially forming a vector that may be regarded a frequency domain representation of the received signal (a vector whose elements represent a corrupted form of the transmitted QAM symbols, with noise and interference). A processor 250b is configured to perform self-FEXT and alien interference cancellation on the frequency-domain QAM symbols, or tones, based on self-FEXT coefficients estimated in a channel estimation block 255b (via a vectoring channel estimation block 265b) and other (e.g., eight) coordinated lines, and alien noise prediction coefficients estimated from an alien noise estimation block 270b. By this cancellation, the QAM symbols are corrected at least partially for self-FEXT and alien interference experienced in the channel 130, yielding a higher signal-to-interference ratio in those lines where the interference mitigation is applied effectively. A slicer block 285b is configured to decide on the transmitted symbols based on the QAM constellation used for each particular carrier and thereby substantially recover the transmitted data. The output of the slicer block 175b is provided to a de-interleaving block 215b, which is configured to remove the interleaving that the interleaving block 215a performed. The data is then provided to an FEC decoder block 210b configured to correct, to the extent possible, any data that may have been corrupted during transmission. The corrected data is then provided to a descrambler block 205b configured to remove the scrambling performed on the data in block 205a, yielding binary data that is then provided to a digital output of the receiver portion 120b of the modem 120. Frequency and timing synchronization blocks 280b, 285b are configured to provide frequency and timing alignment (clock recovery) between the transmitter and receiver portions 120a, 120b.

As described above, the processor 250b is configured to mitigate the self-FEXT and alien interference accompanying the received multi-line signal. Alternative embodiments of the processor 250b perform other functions in the receiver portion 250b and the transmitter portion 120a. For example, various embodiments of the processor 250b perform the functions of one or more of the scrambler block 205a, the FEC block 210a, the interleaving block 215a, the bit loading block 225a, the training sequence block 230a, the channel estimation block 255b, the channel estimation block 260b, the alien noise estimation block 270b, the slicer block 275b, the frequency synchronization block 280b, the timing synchronization block 285b, the de-interleaving block 215b, the FEC decoder block 210b and the descrambler block 205b.

Certain embodiments of the processor 250b are "hybrids" and therefore also have analog processing capability. These embodiments of the processor 250b are therefore configured alternatively or additionally to perform the functions of one or more of the QAM constellation encoder 220a, the IFFT block 235a, the cyclic extension block 240a, the analog front end 245a, the analog front end 245b, the cyclic extension removal block 240b, and the FFT block 235b. In some embodiments, most, if not all of the blocks contained, or the functions carried out in the transmitter and receiver portions 120a, 120b are contained, or carried out, in the processor 250b, which may be embodied in a single, monolithic integrated circuit (IC), or as part of cooperating plural ICs, colloquially called a "chipset." In some embodiments, the processor 250b is a digital signal processor (DSP), a programmable logic array (PLA) or combinations of these.

Also, in the embodiment described above, QAM symbols are tailored for transmission conditions, and self-FEXT and alien noise prediction coefficients are estimated based on channel and noise conditions. In the illustrated embodiment, these functions are performed continually, based on sensed changes in conditions.

Figure 3:
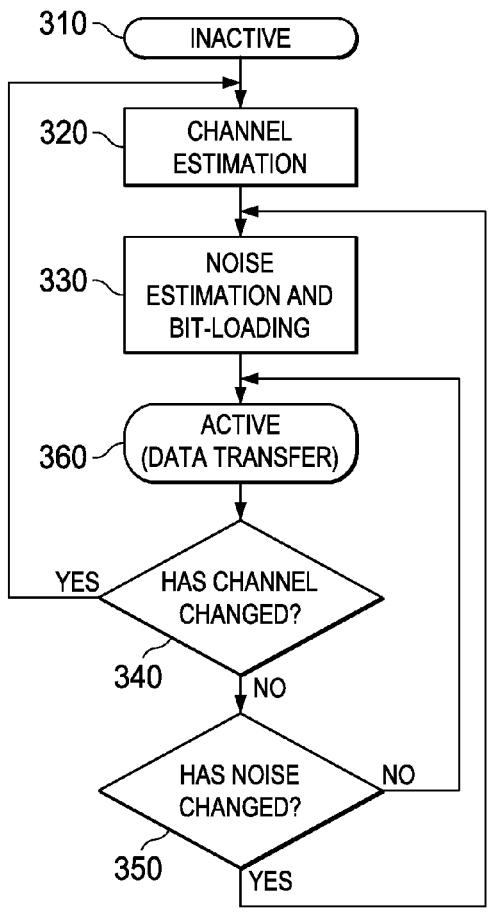
FIG. 3 is a flow diagram of one embodiment of a method of channel estimation, noise estimation and bit-loading, wherein the channel is monitored to determine whether adaptation is needed.

FIG. 3 is a flow diagram of one embodiment of a method of channel estimation, noise estimation and bit-loading that illustrates how this may be carried out. A transmitter (e.g., the transmitter portion 120a of FIG. 2) may operate in an inactive state 310 or an active state 360. During the active state 360, one or more of increases in error rates, increases in incidences of data corruption requiring retransmission and changes in temperature or the voltage, current or impedance of a channel (a particular pair of copper wires) may be sensed, allowing determinations to be made as to whether or not channel characteristics have changed (e.g., relative to a predetermined threshold for changes) or noise characteristics of the channel have changed (e.g., relative to a predetermined threshold).

Corresponding decisional functions 340, 350 decide on whether a corresponding re-estimation of the channel characteristics or noise estimation and QAM bit-loading is needed (represented by the blocks 320, 330). As FIG. 3 indicates, the active state 360 may be maintained if the channel characteristics and the noise characteristics have not changed substantially, as predetermined thresholds define. In an alternative embodiment, the re-estimation of the channel characteristics and interference levels may be assessed during the active state, by allocating portions of the spectrum and/or portions of the lines to the re-estimation, while the remaining tones/lines are used for the normal data transfer.

Having described one environment within which certain embodiments of the method may be incorporated and a modem configured to contain a processor capable of achieving at least near-optimum alien noise cancellation in a DSL binder by way of a reduced-complexity, non-iterative method, mathematical techniques underlying various embodiments of the method itself will now be described.

I. An Alien Noise Mitigation Technique

For each group of $L_c$ coordinated DSL lines in a binder, Equation (1) gives the input-output model at the $m^{th}$ frequency tone:

$$Y_m = H_m X_m + Z_m. \quad (1)$$

After applying zero-forcing self-FEXT cancellation (see, e.g., Cendrillon, et al., "A Near-Optimal Linear Crosstalk Canceller for Upstream VDSL," IEEE Trans. on Sig. Proc., August 2006)), Equation (2) results:

$$\tilde{Y}_m = H_m^{-1} Y_m = X_m + H_m^{-1} Z_m = X_m + \tilde{Z}_m, \quad (2)$$

where $\tilde{Z}_m$ is an alien noise vector of size $L_c$ correlated across the $L_c$ coordinated DSL lines with covariance matrix $H_m^{-1} R_{zz,m} H_m^{-*}$, where $R_{zz,m}$ is the covariance matrix of $z_m$.

The following technique generates alien noise coefficients for each tone m affected by alien noise:

1. Estimate the alien noise vector:

$$\tilde{Z}_m = \tilde{Y}_m - \hat{X}_m, \quad (3)$$

where, in alternative embodiments, $\hat{X}_m$ is a set of training symbols (e.g., as provided by the training sequence block 230a of FIG. 2), tentative decisions resulting from the application of a slicer (e.g., the slicer 275b of FIG. 2) to $\tilde{Y}_m$ and or final decisions after an FEC decoder (e.g., the FEC decoder 210b of FIG. 2). This choice involves a tradeoff between the delay and reliability of the decisions.

2. Estimate the alien noise auto-covariance matrix at tone m as follows:

$$R_m = \frac{1}{N_T} \sum_{j=1}^{N_T} (\tilde{Z}_m - \hat{\mu}_{\tilde{Z}})(\tilde{Z}_m - \hat{\mu}_{\tilde{Z}})^*, \quad (4)$$

where $N_T$ is a number of training DMT symbols, $\hat{\mu}_{\tilde{Z}}$ is an alien noise mean estimator, and $(.)^*$ denotes a complex-conjugate transpose. To improve estimation accuracy, the covariance matrix estimate $R_m$ may be updated continually as more DMT symbols are processed.

3. Use a technique given in Section III, below, to compute a triangular (Cholesky) factorization of $R_m$:

$$R_m = L_m D_m L_m^*, \quad (5)$$

where $L_m$ is a lower-triangular matrix with ones on its main diagonal, and $D_m$ is a diagonal matrix. Equation (5) implies that the alien noise signal vector can be synthesized as follows:

$$Z_m = L_m E_m, \quad (6)$$

where $E_m$ is the prediction error vector with uncorrelated elements (with variances given by the diagonal elements of $D_m$) which satisfies the following relations (by exploiting the triangular structure of $L_m$):

$$E_{m,1} = \tilde{Z}_{m,1}$$

$$E_{m,2} = \tilde{Z}_{m,2} - E_{m,1} L_m(2, 1)$$

$$\vdots \quad \vdots$$

$$E_{m,L_c} = \tilde{Z}_{m,L_c} - \sum_{i=1}^{L_c-1} E_{m,i} L_m(L_c, i)$$

4. Generate an output as follows:

$$\overline{Y}_m = \tilde{Y}_m + (I_{L_c} - L_m) E_m = X_m + E_m, \quad (7)$$

where $I_{L_c}$ denotes an identity matrix of size $L_c$. Since the elements of $E_m$ are uncorrelated, an element-wise slicer is applied to $\overline{Y}_m$ in one embodiment to detect the data symbols. Writing Equation (7) in detail yields:

$$\overline{Y}_{m,1} = \tilde{Y}_{m,1} = X_{m,1} + E_{m,1}$$

$$\overline{Y}_{m,2} = \tilde{Y}_{m,2} - L_m(2, 1) E_{m,1}$$

$$= \tilde{Y}_{m,2} - L_m(2, 1) \tilde{Z}_{m,1}$$

$$= \tilde{Y}_{m,2} + (E_{m,2} - \tilde{Z}_{m,2}) = X_{m,2} + E_{m,2}$$

$$\vdots \quad \vdots$$

$$\overline{Y}_{m,L_c} = \tilde{Y}_{m,L_c} - \sum_{i=1}^{L_c-1} E_{m,i} L_m(L_c, i) = X_{m,L_c} + E_{m,L_c}$$

An important observation is that $\tilde{Y}_{m,j}$ depends only on $E_{m,i}$ for $1 \leq i < j$, which are already available and generated as follows:

$$E_{m,i} = \overline{Y}_{m,i} - \text{dec}(\overline{Y}_{m,i}), \quad (8)$$

where dec(.) denotes a decision at the output of a slicer (e.g., the slicer 275b of FIG. 2) or a decoder (e.g., the FEC decoder 210b of FIG. 2). The output constitutes the alien noise coefficients for alien interference cancellation (e.g., as provided by the alien noise estimation block 270b of FIG. 2)

In summary, the technique described above generates alien noise coefficients as follows:

Input: $L_m$, $\tilde{Y}_m$
Initial Condition: $\overline{Y}_{m,1} = \tilde{Y}_{m,1}$
Steps:

$$\begin{aligned} &\text{For } j = 1 \text{ to } L_c - 1 \\ &\quad E_{m,i} = \overline{Y}_{m,i} - dec(\overline{Y}_{m,i}) \\ &\quad \overline{Y}_{m,j+1} = \tilde{Y}_{m,j+1} - \sum_{i=1}^{j} E_{m,i} L_m(j+1, i) \\ &\text{end} \end{aligned} \quad (9)$$

II. Enhancements to the Alien Noise Mitigation Technique

A. Smoothing the Alien Noise Covariance Estimates

The accuracy of the alien noise covariance estimates given in Equation (4), above, can be further improved by filtering. This exploits the fact that the alien noise coupling impulse response has a finite duration, L, which is much smaller than the number of tones N. Therefore, the time correlation sequence of any pair of coordinated DSL lines within the group becomes negligible for correlation lags greater than L and less than N−L. To improve alien covariance estimate accuracy, these time correlation lags are set to zero in one embodiment.

One embodiment employs the following alien noise covariance estimate smoothing technique:

1. For a given pair of coordinated DSL lines within the group (e.g., lines "k" and "l"), form the following alien noise power spectral density (PSD) estimate vector:

$$p_{k,l}(m)=R_m(k,l): \text{ for } m=1 \text{ to } N, \quad (10)$$

where $R_m(k,l)$ denotes the (k,l) entry of the spatial covariance matrix $R_m$ at the $m^{th}$ frequency tone.

2. Take an IFFT of the alien noise PSD estimate vector to compute alien noise time correlation estimate vectors:

$$r_{k,l}=Q^*p_{k,l}, \quad (10)$$

where Q* denotes the IFFT matrix.

3. Compute a smoothed alien noise time-correlation estimate vector $r_{k,l}^s$ by setting the small middle elements of $r_{k,l}$ to zero, i.e.:

$$r_{k,l}^s = \text{diag}\left(\underbrace{1,\ldots,1}_{L},\underbrace{0,\ldots,0}_{N-2L+1},\underbrace{1,\ldots,1}_{L-1}\right)r_{k,l}, \quad (11)$$

where L is determined by thresholding and, in one embodiment, is different for different DSL line pairs.

4. Generate an output (smoothed alien noise covariance estimate vector) as follows:

$$p_{k,l}^s=Qr_{k,l}^s=Q\text{diag}(1,\ldots,1,0,\ldots,0,1,\ldots,1)Q^*p_{k,l}=F_{k,l}p_{k,l}, \quad (12)$$

where Q is the FFT matrix and $F_{k,l}$ is the N×N smoothing filter matrix for lines k and l, which can vary by line pairs according to the value of L in Equation (12).

5. Repeat the above smoothing procedure for all line pairs within the group where k≥l. (Because of the symmetry of the alien noise spatial covariance matrix, one embodiment of the alien noise covariance estimate smoothing technique does not consider k<l.)

Finally, the smoothed alien noise prediction filter coefficients are given by:

$$\begin{bmatrix} L_1^s(k,l) \\ L_2^s(k,l) \\ \vdots \\ L_N^s(k,l) \end{bmatrix} = F_{k,l} \begin{bmatrix} L_1(k,l) \\ L_2(k,l) \\ \vdots \\ L_N(k,l) \end{bmatrix}: \text{ for } k \geq l, \quad (13)$$

where $L_m$ is the lower-triangular (Cholesky) factor defined in Equation (5), above.

Figure 4:
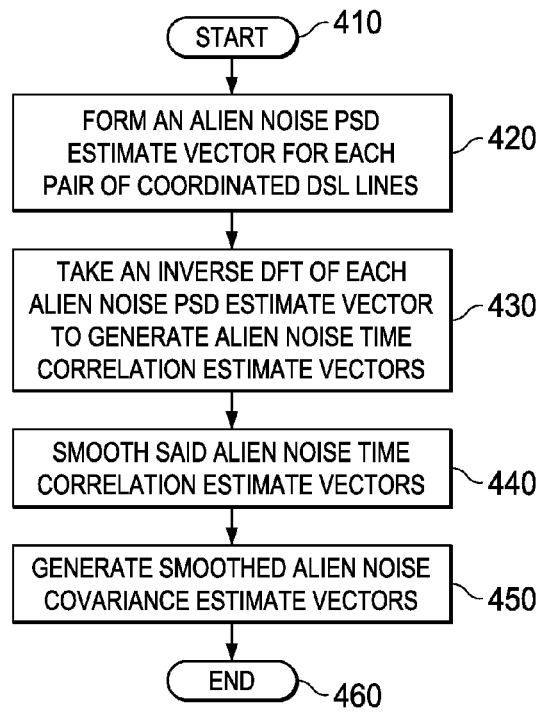
FIG. 4 is a flow diagram of one embodiment of a method of cancelling alien noise in coordinated DSL lines, namely an alien noise covariance estimate smoothing technique.

FIG. 4 is a flow diagram of one embodiment of a method of cancelling alien noise in coordinated DSL lines, specifically an alien noise covariance estimate smoothing technique. The method begins in a start step 410. In a step 420, an alien noise PSD estimate vector is formed for each pair of coordinated DSL lines. In a step 430, an inverse DFT is taken of each alien noise PSD estimate vector to generate alien noise time correlation estimate vectors. In a step 440, the alien noise time correlation estimate vectors are smoothed. In a step 450, smoothed alien noise covariance estimate vectors are generated from the alien noise time correlation estimate vectors. The method ends in a step 460.

B. Enhancing Robustness to Finite-Precision Effects

To improve robustness to finite-precision effects in a fixed-point implementation, the alien noise covariance matrix need not be explicitly computed and factorized using Equations (4) and (5), respectively. The reason is that computing the covariance matrix involves multiplication operations, which doubles the bit precision any processor would be required to provide. Instead, the lower triangular (Cholesky) factor of Equation (5) may be computed indirectly by applying numerically well-conditioned orthonormal transformations (such as Householder or Givens transformations) to the estimated alien noise samples matrix.

The following numerically-robust technique allows the lower-triangular (Cholesky) factor of Equation (5) to be computed indirectly:

For each active tone m:

1. Estimate $N_T$ alien noise vectors (one for each training DMT symbol), and arrange the $N_T$ alien noise vectors in a matrix of size $L_c \times N_T$:

$$\tilde{Z}_m = [\tilde{z}_{m,1}, \tilde{z}_{m,2}, \ldots, \tilde{z}_{m,N_T}].$$

2. Apply an orthonormal (e.g., Householder or Givens) transformation $Q_m$ to the alien noise matrix formed in the previous step to put it in the form:

$$\frac{1}{\sqrt{N_T}}\tilde{Z}_m Q_m = [\bar{L}_m \quad 0],$$

where $\bar{L}_m$ is a lower-triangular matrix of size $L_c \times L_c$ which is related to $L_m$ of Equation (5) as follows:

$$R_{\tilde{z},m} = \left(\frac{1}{\sqrt{N_T}}\tilde{Z}_m\right)\left(\frac{1}{\sqrt{N_T}}\tilde{Z}_m^*\right) = \left([\bar{L}_m \quad 0]Q_m^*\begin{bmatrix}\bar{L}_m^* \\ 0\end{bmatrix}\right)$$

$$= \bar{L}_m \bar{L}_m^*$$

$$= L_m D_m L_m^*$$

Hence, $L_m = \bar{L}_m D_m^{-1/2}$.

The methods for computing the Cholesky (triangular) factor matrix described above require all $N_T$ DMT symbols to be processed together. However, the $N_T$ DMT symbols are transmitted sequentially in time. Therefore, to process all $N_T$ DMT symbols together, they are stored as they arrive, and the computation of the Cholesky (triangular) factor matrix is begun only after last DMT symbol is received. This requires more memory and increases the total time needed to obtain the Cholesky (triangular) factor matrix.

Alternative embodiments employ a modified method of computing the Cholesky (triangular) factor matrix in which the matrix is continually updated with newly-estimated alien noise vectors. In one embodiment to be described beginning in the next paragraph, the newly-estimated alien noise vectors are appended to the current triangular factor matrix, and orthonormal transformations (e.g., Householder or Givens) are applied to zero out the appended alien noise vectors. The current triangular factor matrix is therefore updated to yield a new triangular factor matrix of the updated alien noise spatial covariance matrix.

In the embodiment mentioned immediately above, the Cholesky (triangular) factorization of the current $L_c \times L_c$ alien noise spatial covariance matrix (based on $N_T$ DMT symbols) at the $m^{th}$ subcarrier is given by:

$$R_m = \bar{L}_m \bar{L}_m^*, \quad (14)$$

As $N_s$ additional DMT symbols are processed, the alien noise covariance matrix is updated to:

$$R_{m,new} = R_m + \frac{1}{N_s} \sum_{j=1}^{N_s} (\tilde{Z}_{m,j} - \hat{\mu}_{m,new})(\tilde{Z}_{m,j} - \hat{\mu}_{m,new})^* \quad (15)$$

$$\stackrel{def}{=} R_m + Z_{m,new} Z_{m,new}^*,$$

where the $L_c \times N_s$ new alien noise samples matrix is given by:

$$Z_{m,new} = \quad (16)$$

$$\frac{1}{\sqrt{N_s}} [\tilde{Z}_{m,1} \; \tilde{Z}_{m,2} \; \ldots \; \tilde{Z}_{m,N_s}] - [\hat{\mu}_{m,new} \; \hat{\mu}_{m,new} \; \ldots \; \hat{\mu}_{m,new}].$$

The vector $\hat{\mu}_{m,new}$ is the mean of the alien noise vectors at the $m^{th}$ subcarrier which is updated based on its old estimate $\hat{\mu}_{m,old}$ and the new alien noise samples as follows:

$$\hat{\mu}_{m,new} = \frac{1}{N_s + N_t} \sum_{j=1}^{N_s+N_t} \tilde{Z}_{m,j} \quad (17)$$

$$= \frac{N_t}{N_s + N_t N_t} \left( \sum_{j=1}^{N_t} \tilde{Z}_{m,j} + \sum_{j=N_t+1}^{N_t+N_s} \tilde{Z}_{m,j} \right)$$

$$= \frac{N_t}{N_s + N_t} \hat{\mu}_{m,old} + \frac{1}{N_s + N_t} \sum_{N_t+1}^{N_s+N_t} \tilde{Z}_{m,j}.$$

From Equations (14) and (15), the updated alien noise spatial covariance matrix may be expressed as follows:

$$R_{m,new} = \bar{L}_m \bar{L}_m^* + Z_{m,new} Z_{m,new}^* \quad (18)$$

$$= [\bar{L}_m \; Z_{m,new}] \begin{bmatrix} \bar{L}_m^* \\ Z_{m,new}^* \end{bmatrix}$$

$$\stackrel{def}{=} \bar{L}_{m,new} \bar{L}_{m,new}^*$$

$$= [\bar{L}_{m,new} \; 0_{L_c \times N_s}] \begin{bmatrix} \bar{L}_{m,new}^* \\ 0_{N_s \times L_c} \end{bmatrix}$$

From the second and fourth equalities above, the following can be written:

$$[\bar{L}_{m,new} 0_{L_c \times N_s}] = [\bar{L}_m Z_{m,new}] Q_m, \quad (19)$$

where $Q_m$ is an orthonormal matrix (e.g., Householder reflections). Equation (19) shows that the updated Cholesky factor matrix $\bar{L}_{m,new}$ is computed by appending the new alien noise vectors to the old Cholesky factor $\bar{L}_m$ and applying orthonormal transformations to $Q_m$ zero out the new alien noise samples.

Figure 5:
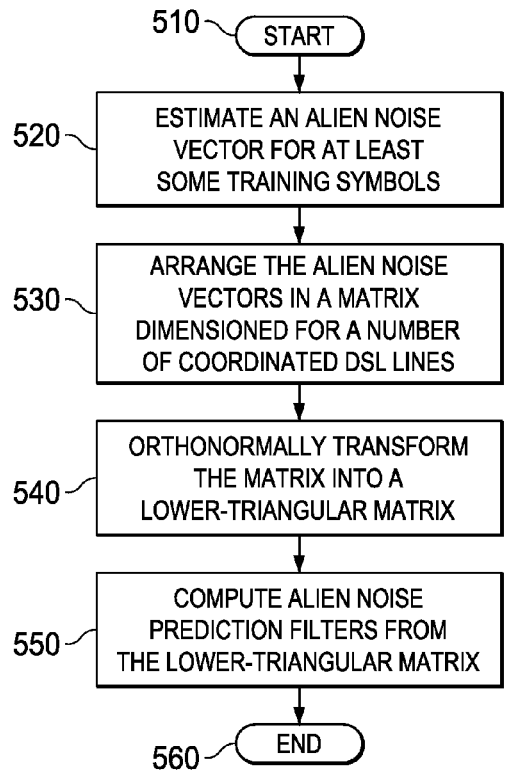
FIG. 5 is a flow diagram of one embodiment of a method of cancelling alien noise in coordinated DSL lines, namely a technique for employing an orthonormal transformation to compute indirectly a lower-triangular factor of an alien noise auto-covariance matrix.

FIG. 5 is a flow diagram of one embodiment of a method of cancelling alien noise in coordinated DSL lines, namely a technique for employing an orthonormal transformation to compute indirectly a lower-triangular (Cholesky) factor of an alien noise auto-covariance matrix. The method begins in a start step 510. In a step 520, alien noise vectors are estimated for at least some training symbols. In one embodiment, the training symbols are DMT symbols. In another embodiment, an alien noise vector is estimated for each training symbol. In a step 530, the alien noise vectors are arranged in a matrix dimensioned for a number of coordinated DSL lines. The matrix is also dimensioned to accommodate the alien noise vectors. In a step 540, the matrix is orthonormally transformed into a lower-triangular matrix. In a step 550, a lower-triangular (Cholesky) factor is computed from the lower-triangular matrix. The method ends in a step 560.

C. Reconfigurable Noise De-Correlation Technique and Architecture

The performance and latency of the proposed alien noise cancellation method given in Equations (7) and (8) can be improved by using a noise de-correlation architecture that can be reconfigured for fully-serial, fully-parallel and hybrid use. This is based on the realization that the number of coordinated lines required to achieve substantial performance improvement depends on the nature and strength of the alien noise experienced and is usually small. The alien noise de-correlation of Equation (9) discussed in section I, above, may therefore be enhanced as follows:

1. For a group of $L_c$ coordinated lines in a DSL binder, choose a reference line (assumed to be line 1 without a loss of generality). Divide the remaining ones of the $(L_c-1)$ lines almost equally to form K subsets, where each subset includes the chosen reference line and up to $$\left\lceil \frac{L_c - 1}{K} \right\rceil$$

other DLS lines. Each of the K subsets can have up to $$L_{subset} = 1 + \left\lceil \frac{L_c - 1}{K} \right\rceil$$

DSL lines.

2. The de-correlation technique of Equation (9), above, is modified to incorporate K parallel noise de-correlators as follows:

Input: $L_m, \tilde{Y}_m$
Initial Condition: $\bar{Y}_{m,1} = \tilde{Y}_{m,1}$
Steps:

$$\text{For } j = 1 \text{ to } L_{subset} - 1 \quad (20)$$

$$E_{1,m,j} = \bar{Y}_{1,m,j} - dec(\bar{Y}_{1,m,j})$$

$$\vdots = \vdots$$

$$E_{K,m,j} = \bar{Y}_{K,m,j} - dec(\bar{Y}_{K,m,j})$$

$$\bar{Y}_{1,m,j+1} = \tilde{Y}_{1,m,j+1} - \sum_{i=1}^{j} E_{1,m,i} L_m(1, j+1, i)$$

$$\vdots = \vdots$$

$$\bar{Y}_{K,m,j+1} = \tilde{Y}_{K,m,j+1} - \sum_{i=1}^{j} E_{K,m,i} L_m(K, j+1, i)$$

end

The subscripts i, m and j respectively denote the $i^{th}$ subset, the $m^{th}$ frequency tone and the $j^{th}$ line.

In various embodiments, the modified alien noise de-correlation architecture reduces the latency of the alien noise cancellation by a factor of K, with minimal effect on the performance. The overall performance of the alien noise cancellation can be significantly improved by using final decisions (obtained after FEC decoding) instead of tentative decision (obtained by applying a slicer) in the technique of Equation (20). The use of a decoder (instead of a slicer) to improve the reliability of the decisions is made possible due to parallel de-correlation architecture which reduces the latency of the noise de-correlator by a factor of K.

Figure 6:
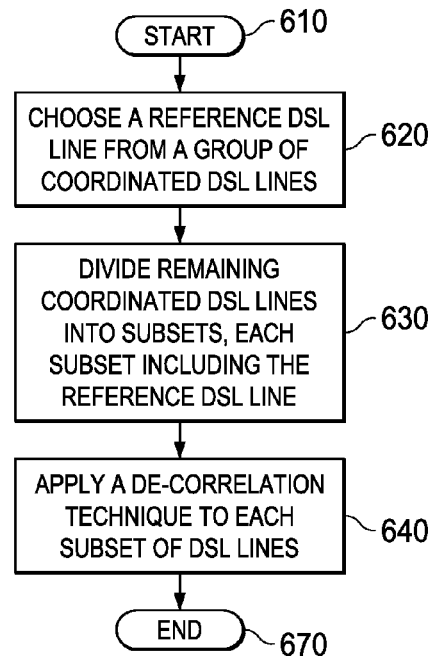
FIG. 6 is a flow diagram of one embodiment of a method of cancelling alien noise in coordinated DSL lines, namely a technique for dividing the coordinates DSL lines into subsets with a common reference line and applying decorrelation techniques within each subset.

FIG. 6 is a flow diagram of one embodiment of a method of cancelling alien noise in coordinated DSL lines, specifically a reconfigurable noise de-correlation method. The method begins in a start step 610. In a step 620, a reference DSL line is chosen from a group of coordinated DSL lines. In a step 630, the remaining coordinated DSL lines are divided into subsets, each subset including the reference DSL line chosen in the step 620. In a step 640, a de-correlation technique is applied to each subset of DSL lines. In one embodiment, the de-correlation technique is concurrently applied to each subset, reducing computational latency. The method ends in a step 650.

III. Triangular Factorization

In one embodiment, the following technique (see, e.g., Golub, et al., "Matrix Computations," John Hopkins University Press, Second Edition, 1989) is used to compute the triangular (Cholesky) factorization $R_m = L_m D_m L_m^*$, where $L_m$ is a lower-triangular matrix with ones on its main diagonal, and $D_m$ is a diagonal matrix. (The sub-carrier index m is suppressed to simplify notation.)

Steps:

For $j = 1, \ldots, L_c$

For $i = 1, \ldots, (j-1)$ $v(i) = conj(R(j, i) \times R(i, i))$ end for $i$

If $j > 1$ $v(j) = R(j, j) - R(j, 1: j-1) \times v(1: j-1)$ else $v(j) = R(j, j)$ end If $j$ $R(j, j) = v(j)$ If $j > 1$ $$R(j+1: L_c, j) = \frac{R(j+1: L_c, j) - R(j+1: L_c, 1: j-1) \times v(1: j-1)}{v(j)}$$

else $$R(j+1: L_c, j) = \frac{R(j+1: L_c, j)}{v(j)}$$

end If $j$ end for $j$

For $j = 1, \ldots, L_c$ $L(i, i) = 1$ $D(i, i) = R(i, i)$

For $j = 1, \ldots, (i-1)$ $L(i, j) = R(i, j)$ end for $j$ end for $i$

IV. Data Rate Calculations

The well-known gap approximation can be employed to estimate the achievable data rates with and without alien noise cancellation.

With reference to Equation (2), above, the frequency-domain received signal at the $i^{th}$ line ($1 \leq i \leq L_c$) and the $m^{th}$ tone after FEXT cancellation (assuming perfect multiple-input, multiple-output (MIMO) channel estimation) and before alien noise cancellation is given by:

$$\tilde{Y}_{m,i} = X_{m,i} + \tilde{Z}_{m,i}.$$

Hence, using the gap approximation, the total (over all lines) achievable data rate is given by:

$$R_{total}^{before} = \Delta f \sum_{i=1}^{L_c} \sum_{m=1}^{\bar{N}} \log_2 \left(1 + \frac{S_{x,m,i}}{\Gamma \sigma_{\tilde{z},m,i}^2}\right), \quad (21)$$

where $\Delta f$ is the sub-channel width, $\bar{N}$ is the number of used tones (assumed the same for all lines), $S_{x,m,i}$ is the input PSD for the $i^{th}$ line at the $m^{th}$ tone, and the alien noise variance at the $m^{th}$ tone of the $i^{th}$ line is given by $\sigma_{\tilde{z},m,i}^2 = R_m(i,i)$. The gap $\Gamma$ is calculated as follows:

$$\Gamma = \frac{\gamma_{margin}}{3\gamma_{coding}} \left(Q^{-1}\left(\frac{P_e}{2}\right)\right)^2,$$

where $\gamma_{margin}$ is the desired performance margin, $\gamma_{coding}$ is the coding gain, and $P_e$ is the error rate. As a reference point, $\Gamma = 9.8$ dB at a $10^{-7}$ error rate for an uncoded system with no system margin.

Assuming perfect estimation of the alien noise covariance matrix in Equation (5) and using Equation (8), the total (over all coordinated DSL lines) achievable data rate after alien noise cancellation is given by:

$$R_{total}^{after} = \Delta f \sum_{i=1}^{L_c} \sum_{m=1}^{\bar{N}} \log_2 \left(1 + \frac{S_{x,m,i}}{\Gamma \sigma_{e,m,i}^2}\right), \quad (22)$$

where $\sigma_{e,m,i}^2 = D_m(i,i)$ is the variance of the de-correlated alien noise at the $m^{th}$ tone of the $i^{th}$ line and is computed from Equation (6).

Figure 7:
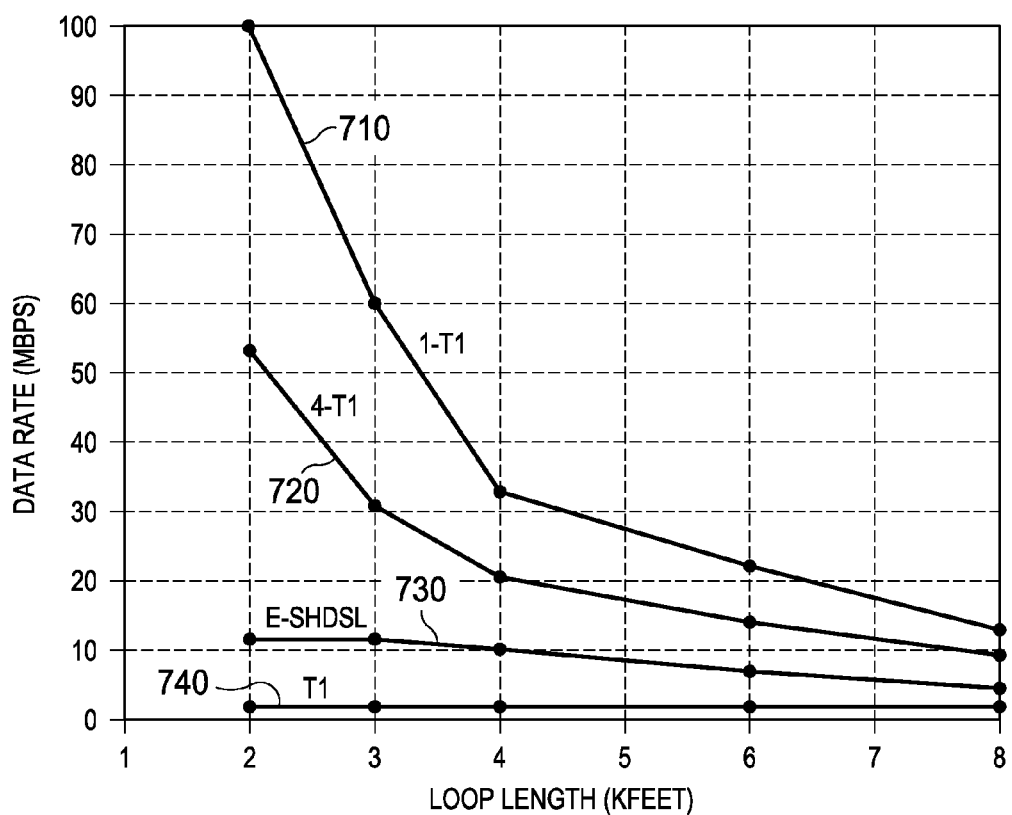
FIG. 7 is a graph showing data rates as a function of copper backhaul link length for an embodiment of the invention (assuming interference from single and multiple T-carrier 1 (T1) lines coexisting in the same copper binder) versus conventional Extended Single-Pair High-speed DSL (E-SHDSL) and T1 lines.

FIG. 7 is a graph showing data rates as a function of copper backhaul link length for an embodiment of the invention versus conventional Extended Single-Pair High-speed DSL (E-SHDSL) and T1 lines. A trace 710 shows data rates assuming interference from a single T1 line coexisting in the same copper binder. A trace 720 shows data rates assuming interference from multiple T1 lines coexisting in the same copper binder. The traces 710, 720 assume both self-FEXT cancellation and alien interference mitigation and comply with Profile 17a of the VDSL2 standard. It is also assumed that eight 24-AWG DSL lines are coordinated, and that the coding gain and system margin are 5 dB and 6 dB, respectively. It is also assumed that the interference from T1 lines reflects a 1% worst-case NEXT coupling (i.e., statistically, with a probability of 99%, the interference is typically weaker than this level).

A trace 730 shows data rates for an E-SHDSL line. A trace 740 shows data rates for a T1 line. The traces 730, 740 assume that the E-SHDSL and T1 lines are not affected by interference.

FIG. 8 is a graph comparing data rates as a function of copper backhaul link length for an embodiment of the invention under conditions of perfect self-FEXT cancellation (a trace 810) and no self-FEXT cancellation (a trace 820). For both of the traces 810, 820, it is assumed that no alien interference is present, throughputs are specified as average data rate per line and eight DSL lines are coordinated.

FIG. 9 is a graph showing data rates as a function of copper backhaul link length for a hypothetical case with perfect self-FEXT cancellation and perfect alien mitigation, i.e., it is as if no self-FEXT or alien interference is present (a trace 910), an embodiment employing self-FEXT cancellation and alien mitigation (a trace 920) and an embodiment of the invention employing only self-FEXT cancellation (a trace 930). For the traces 910, 920, 930, it is assumed that eight 24-AWG DSL lines are coordinated and coexisting with a T1 line in the same copper binder and that they comply with Profile 17*a* of the VDSL2 standard, which defines the spectrum allocation for the upstream and downstream signals and the corresponding power levels.

Those skilled in the art to which this application relates will appreciate that other and further additions, deletions, substitutions and modifications may be made to the described embodiments.

What is claimed is:

1. A method of cancelling alien noise, comprising:
    estimating spatial cross-correlation and computing alien noise prediction filter coefficients for at least a portion of received training symbols, wherein a noise observed per subcarrier on at least a plurality of coordinated digital subscriber line (DSL) lines is arranged as a vector for each of said training symbols;
    arranging said noise vectors for multiple training symbols in a matrix $\tilde{Z}_m$ defined by an equation:

$$\tilde{Z}_m = [\tilde{Z}_{m,1}, \tilde{Z}_{m,2}, \ldots \tilde{Z}_{m,N_T}]$$

wherein m is a subcarrier and $N_T$ is a number of training DMT symbols;
    orthonormally transforming said matrix $\tilde{Z}_m$ into a triangular matrix $\bar{L}_m$ to estimate said spatial cross-correlation wherein triangular matrix $\bar{L}_m$ is defined by an equation:

$$\frac{1}{\sqrt{N_T}} \tilde{Z}_m Q_m = [\bar{L}_m 0]$$

wherein $Q_m$ is an orthonormal transformation matrix;
    computing alien noise prediction filter coefficients from said triangular matrix; and
    applying said computed alien noise prediction filter coefficients to an incoming data symbol during data transmission to calculate correlated alien noise terms per subcarrier for plurality of coordinated DSL lines, wherein said alien noise is substantially mitigated by removing said calculated correlated noise from said incoming data symbol.

2. The method as recited in claim 1 wherein said training symbols are training discrete multi-tone (DMT) symbols and said estimating comprises estimating an alien noise vector for each of said training DMT symbols.

3. The method as recited in claim 1 wherein said orthonormally transforming comprises employing a Householder transformation or a Givens transformation.

4. The method as recited in claim 1 further comprising computing alien noise prediction filter coefficients from said lower-triangular factor.

5. The method as recited in claim 4 wherein said alien noise prediction filter coefficients are optimum alien noise prediction filter coefficients.

6. The method as recited in claim 1 wherein said computing said lower-triangular factor comprises computing said lower-triangular factor based on one selected from the group consisting of:
    training sequences,
    tentative decisions from a slicer, and
    final decisions from a decoder.

7. The method as recited in claim 1 wherein said alien noise originates at least in part from one or more non-binder external sources.

8. The method as recited in claim 1 wherein said alien noise originates at least in part from one or more single-carrier-based transmitter.

9. The method as recited in claim 1 wherein said alien noise originates at least in part from one or more multi-carrier-based transmitter.

10. The method as recited in claim 1 wherein said method is carried out in a DMT-based modem.

11. The method as recited in claim 1 wherein said alien noise originates at least in part from one or more lines in a same copper binder.

12. The method as recited in claim 1 wherein said alien noise originates at least in part from one or more lines in an adjacent copper binder.

13. A processor for cancelling alien noise, comprising:
    circuitry configured to estimate spatial cross-correlation and compute alien noise prediction filter coefficients for at least a portion of received training symbols, wherein a noise observed per subcarrier on at least a plurality of coordinated digital subscriber line (DSL) lines is arranged as a vector for each of said received training symbols;
    circuitry configured to arrange said noise vectors for multiple training symbols in a matrix $\tilde{Z}_m$ defined by an equation:

$$\tilde{Z}_m = [\tilde{Z}_{m,1}, \tilde{Z}_{m,2}, \ldots \tilde{Z}_{m,N_T}]$$

wherein m is a subcarrier and $N_T$ is number of training DMT symbols;
    circuitry configured to orthonormally transform said matrix $\tilde{Z}_m$ into a triangular matrix $\bar{L}_m$ to estimate said spatial cross-correlation wherein triangular matrix $\bar{L}_m$ is defined by an equation:

$$\frac{1}{\sqrt{N_T}} \tilde{Z}_m Q_m = [\bar{L}_m 0]$$

wherein $Q_m$ is an orthonormal transformation matrix;
    circuitry configured to compute alien noise prediction filter coefficients from said triangular matrix; and
    circuitry configured to apply said computed alien noise prediction filter coefficients to an incoming data symbol during data transmission to calculate correlated alien noise terms per subcarrier for said plurality of coordinated DSL lines, wherein said alien noise is substantially mitigated by removing said calculated correlated noise from said incoming data symbol.

14. The processor as recited in claim 13 wherein said training symbols are training DMT symbols and said circuitry configured to estimate said alien noise vectors is configured to estimate an alien noise vector for each of said training DMT symbols.

15. The processor as recited in claim 13 wherein said circuitry configured to orthonormally transform said matrix is configured to employ a Householder transformation or a Givens transformation.

16. The processor as recited in claim 13 further comprising circuitry configured to compute alien noise prediction filter coefficients from said lower-triangular factor.

17. The processor as recited in claim 16 wherein said alien noise prediction filter coefficients are optimum alien noise prediction filter coefficients.

18. The processor as recited in claim 13 wherein said circuitry configured to compute said lower-triangular factor is configured to compute said lower-triangular factor based on one selected from the group consisting of:
training sequences,
tentative decisions from a slicer, and
final decisions from a decoder.

19. The processor as recited in claim 13 wherein said alien noise originates at least in part from lines in a same copper binder.

20. The processor as recited in claim 13 wherein said alien noise originates at least in part from lines in an adjacent copper binder.

21. The processor as recited in claim 13 wherein said alien noise originates at least in part from a non-binder external source.

22. The processor as recited in claim 13 wherein said alien noise originates at least in part from a single-carrier-based transmitter.

23. The processor as recited in claim 13 wherein said alien noise originates at least in part from a multi-carrier-based transmitter.

24. The processor as recited in claim 13 wherein said method is carried out in a DMT-based modem.

25. A method of updating a spatial-correlation triangular factor matrix, comprising:
appending a new noise vector derived from noise observed per subcarrier for at least a plurality of coordinated digital subscriber line (DSL) lines for each incoming training symbol to a current spatial-correlation triangular factor matrix;
applying orthonormal transformations to zero out said new appended noise vector thereby to update said current triangular factor matrix $L_m$ to a new triangular factor matrix $L_{m,new}$ defined by an equation:

$$[L_{m,new}] = [\bar{L}_m Z_{m,new}] Q_m$$

wherein m is a subcarrier, $Z_{m,new}$ is a new alien noise vector, and $Q_m$ is an orthonormal transformation matrix; and
computing updated alien noise prediction filter coefficients from said new triangular factor matrix, wherein said computations are repeated for each new training symbol to continually update said spatial-correlation triangular factor matrix and said alien noise prediction filter coefficients.

26. The method as recited in claim 25 wherein said orthonormal transformations are selected from the group consisting of:
Givens rotations, and
Householder reflections.

* * * * *